(12) United States Patent
Lauber

(10) Patent No.: US 7,476,000 B1
(45) Date of Patent: Jan. 13, 2009

(54) HANDHELD ILLUMINATED APPARATUS FOR RETAINING A FOOD ITEM IN AN EDIBLE CONDITION WITH THE ILLUMINATION DIRECTLY PASSING THROUGH THE FOOD ITEM

(75) Inventor: Gary A. Lauber, Simi Valley, CA (US)

(73) Assignee: Glo Cone International, LLC, Henderson, NV (US)

( * ) Notice: Subject to any disclaimer, the term of this patent is extended or adjusted under 35 U.S.C. 154(b) by 0 days.

(21) Appl. No.: 12/072,780

(22) Filed: Feb. 27, 2008

(51) Int. Cl.
  *F21V 33/00* (2006.01)
(52) U.S. Cl. ............... 362/109; 362/253; 362/234; 362/251; 362/249; 362/189
(58) Field of Classification Search ............... 362/109, 362/253, 806, 189, 234, 249, 251
  See application file for complete search history.

(56) References Cited

U.S. PATENT DOCUMENTS

| 4,914,748 | A | * | 4/1990 | Schlotter et al. ............ 362/109 |
| 5,079,679 | A | * | 1/1992 | Chin-Fa ....................... 362/102 |
| 5,939,983 | A | * | 8/1999 | Rudell et al. ................. 340/540 |
| 6,273,580 | B1 | * | 8/2001 | Coleman et al. ............. 362/109 |
| 6,572,244 | B1 |   | 6/2003 | Clark |
| 6,955,450 | B2 | * | 10/2005 | Johnson ....................... 362/253 |
| 7,073,917 | B2 |   | 7/2006 | VanderSchuit |
| 2004/0062039 | A1 | * | 4/2004 | Ahn ............................ 362/192 |
| 2005/0083676 | A1 |   | 4/2005 | VanderSchuit |
| 2006/0291191 | A1 |   | 12/2006 | Vanderschuit |

* cited by examiner

*Primary Examiner*—Laura Tso
(74) *Attorney, Agent, or Firm*—Thomas I. Rozsa

(57) ABSTRACT

An apparatus to retain an edible food item having an illumination cover having an interior chamber and connected to a handle member having an interior chamber with a source of electrical power retained within the interior chamber of the handle member and an activation means connected to the source of power. A circuit board is retained within the interior chamber of the illumination cover and electrically connected to the source of power. The source of illumination is retained within the illumination cover and an edible food item is retained on the illumination cover so that when activated, the source of illumination causes light to be projected through the illumination cover and directly into and through the edible food item.

20 Claims, 5 Drawing Sheets

HANDHELD ILLUMINATED APPARATUS FOR RETAINING A FOOD ITEM IN AN EDIBLE CONDITION WITH THE ILLUMINATION DIRECTLY PASSING THROUGH THE FOOD ITEM

BACKGROUND OF THE INVENTION

1. Field of the Invention

The present invention relates to the field of apparatus which can retain a food item in an edible condition and also illuminates the food item to provide an aesthetic appearance and ornamental presentation of the edible food item.

2. Description of the Prior Art

In general, items that retain a food item and have illumination within the retention item are known in the prior art. The following prior art patents and published applications which are relevant to the present invention are known to the present inventor:

1. United States published Patent Application 2005/0083676 A1 issued to VanderSchuit. The application was published on Apr. 21, 2005 and is entitled "LIGHTED ITEMS".

2. Published Patent Application 2006/0291191 A1 to Vanderschuit published on Dec. 28, 2006 for "ILLUMINATED IMPLEMENTS FOR DRINKING AND/OR EATING AND RELATED METHODS".

3. U.S. Pat. No. 6,572,244 B1 issued to Clark on Jun. 3, 2003 for "NOVELTY ITEM HAVING ILLUMINATING HANDLE".

4. U.S. Pat. No. 7,073,917 B2 issued to VanderSchuit on Jul. 11, 2006 for "ILLUMINATED IMPLEMENTS FOR DRINKING AND/OR EATING AND RELATED METHODS".

The first published VanderSchuit patent for an "ILLUMINATED ITEM" essentially has illuminated indicia on the handle itself. There is no method for causing the source of illumination to directly shine through the food item retained on the retaining apparatus.

The second VanderSchuit published application and the issued VanderSchuit patent talk about having the food item extending through a drinking straw type apparatus with the illumination within the drinking straw type apparatus.

The Clark patent basically talks about having a food item with a source of illumination in the retention apparatus which retains the food item but a key drawback of this invention is that the light source is retained within the handle section and is caused to be reflected into the portion which retains the food item. This does not have the substantial visual enhancement that is preferred by having a direct source of illumination extending from the food retaining item directly into the food item itself.

There is a significant need for an improved innovation wherein the source of illumination is directly caused to illuminate from the apparatus retaining the food item directly into the food item to therefore provide an enhanced visual effect.

SUMMARY OF THE INVENTION

The present invention is an apparatus to retain an edible food item having an illumination cover having an interior chamber and connected to a handle member having an interior chamber with a source of electrical power retained within the interior chamber of the handle member and an activation means connected to the source of power. A circuit board is retained within the interior chamber of the illumination cover and electrically connected to the source of power. The source of illumination retained within the illumination cover and an edible food item retained on the illumination cover so that when activated, the source of illumination causes light to be projected through the illumination cover and directly into and the edible food item.

It has been discovered, according to the present invention, that if a handheld apparatus includes an illumination cover which contained a source of illumination within the illumination cover and a food item is retained on the illumination cover, then when the source of illumination is activated, the light will shine through the illumination cover and directly into and through the edible food item, to thereby provide an enhanced aesthetic and visual appearance to the food item.

It has also been discovered, according to the present invention, that if the source of illumination contains a multiplicity of colors and is caused to emit different illumination sequences, then the visual beauty of the illumination effect through the food item is enhanced.

It has additionally been discovered, according to the present invention that LEDs are the preferred source of illumination.

It has additionally been discovered, according to the present invention, that if the source of power is retained within a handle while the illumination is within the cover retaining the food item, then the illumination effect is substantially enhanced.

It is therefore an object of the present invention to provide an apparatus to retain a food item while it is being consumed and to provide a source of illumination in the areas where the food item is being retained so that the illumination will shine directly into and through the food item to provide an enhanced visual effect.

The key object of the present invention is to cause the illumination to be emitted from the area where the food item is being retained so that the illumination directly shines into and through the food item.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Figure 1:
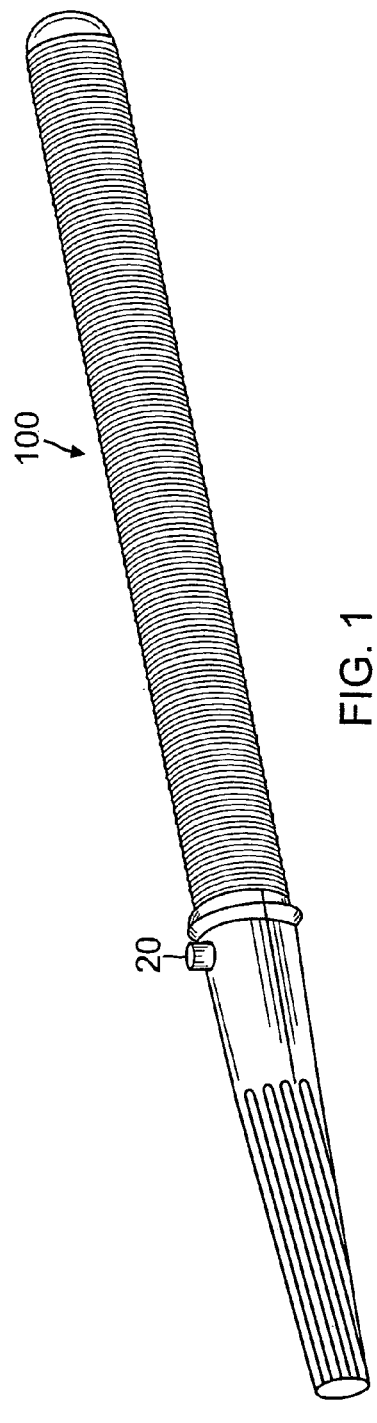
FIG. 1 is a perspective view of the present invention handheld illuminated apparatus for retaining a food item in an edible condition with the food item removed from the apparatus.
Figure 2:
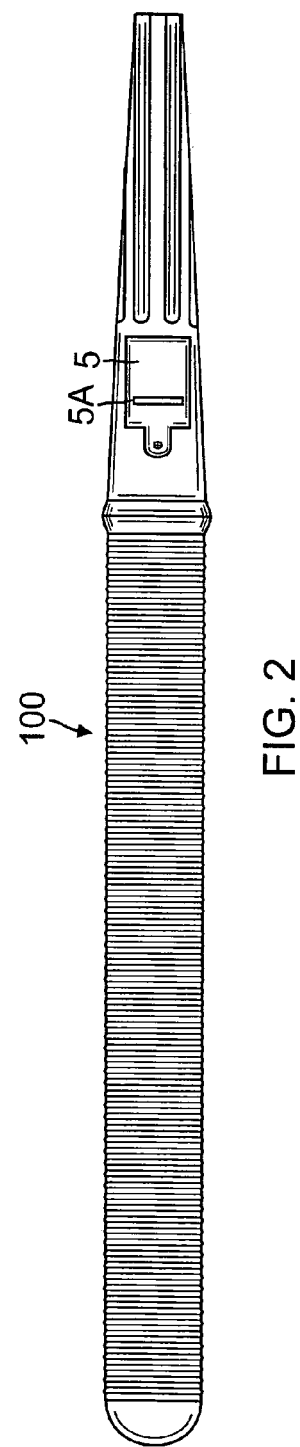
FIG. 2 is a bottom plan view of the present invention handheld illuminated apparatus for retaining a food item in an edible condition with the food item removed from the apparatus.
Figure 3:
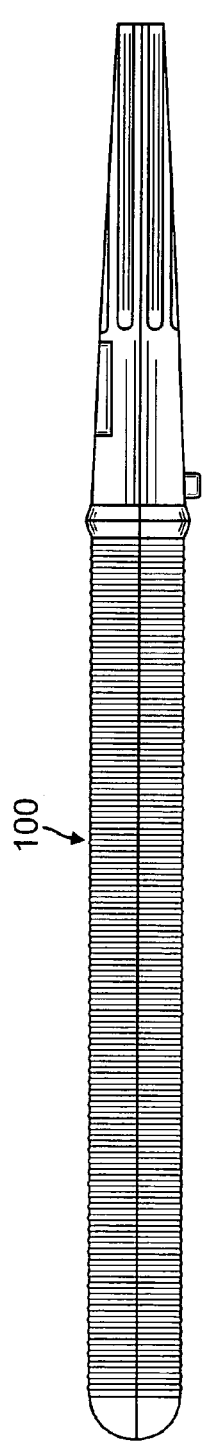
FIG. 3 is a side elevational view from one side of the present invention handheld illuminated apparatus for retaining a food item in an edible condition with the food item removed from the apparatus.
Figure 4:
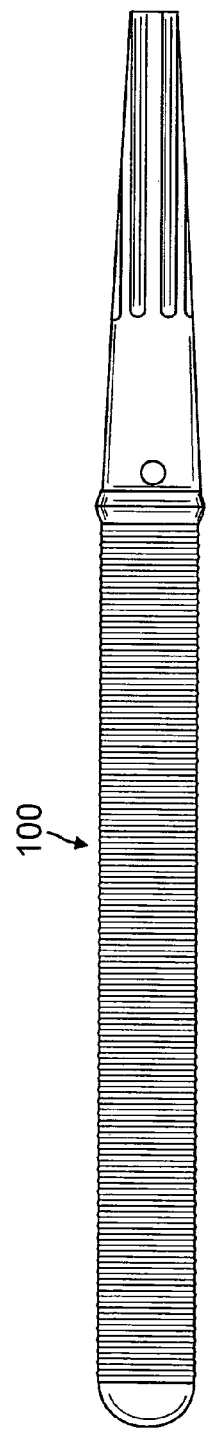
FIG. 4 is a top plan view of the present invention handheld illuminated apparatus for retaining a food item in an edible condition with the food item removed from the apparatus.
Figure 5:
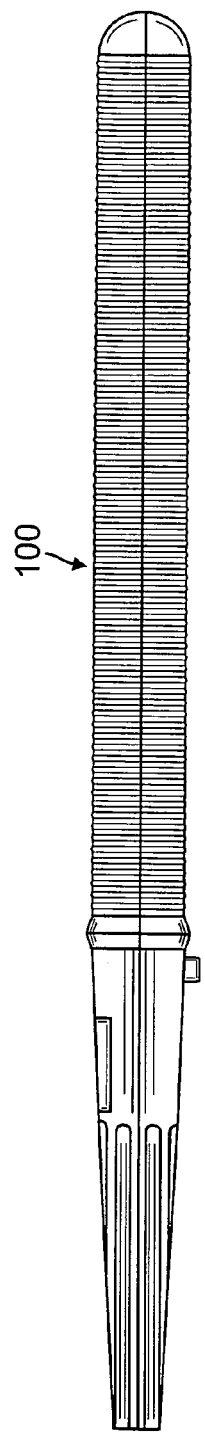
FIG. 5 is a side elevational view from the side opposite the view in FIG. 3 of the present invention handheld illuminated apparatus for retaining a food item in an edible condition with the food item removed from the apparatus.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 through 6, there is illustrated the present invention handheld illuminated apparatus 100 for retaining a food item, with the food item removed from the apparatus. The illuminated apparatus 100 is comprised of an upper illumination cover 1 and a bottom illumination cover 2 which are fitted together as illustrated in FIGS. 1 through 5. The upper illumination cover 1 has an elongated interior chamber 1A and optionally has ribs 1B on its exterior surface. The bottom illumination cover 2 has an elongated interior chamber 2A and optionally has ribs 2B on its exterior surface. When the upper illumination cover 1 and bottom illumination cover 2 are fitted together, the interior chambers 1A and 2A are aligned and the exterior ribs 1B and 2B are also aligned.

The illuminated apparatus 100 also comprises a hand handle upper cover 3 and a mating hand handle bottom cover 4. The hand handle upper cover 3 has an elongated interior chamber 3A and the hand handle bottom cover 4 has an elongated interior chamber 4A. When the hand handle upper cover 3 and hand handle bottom cover 4 are aligned, the elongated interior chambers 3A and 4A are also aligned. A battery 14 is retained within the interior chamber 4A and is respectively surrounded on opposite sides by an anode battery slice 9 and a cathode battery slice 10. Access to the battery is gained by a battery cover 5 which covers the battery 14 during normal use. The battery cover 5 contains an opening 5A through which an insulating slice 7 extends. The insulating slice serves to disconnect the battery and thereby save battery life. When the insulating slice 7 is removed, the battery 14 is connected to the anode battery slice 9 and cathode battery slice 10. The hand handle upper cover 3 and hand handle lower cover 4 are retained together by key 6. To assist in grasping the handle covers, hand handle upper cover 3 may have exterior ribs 3B on its exterior surface and hand handle bottom cover 4 may have ribs 4B on its exterior surface.

Figure 6:
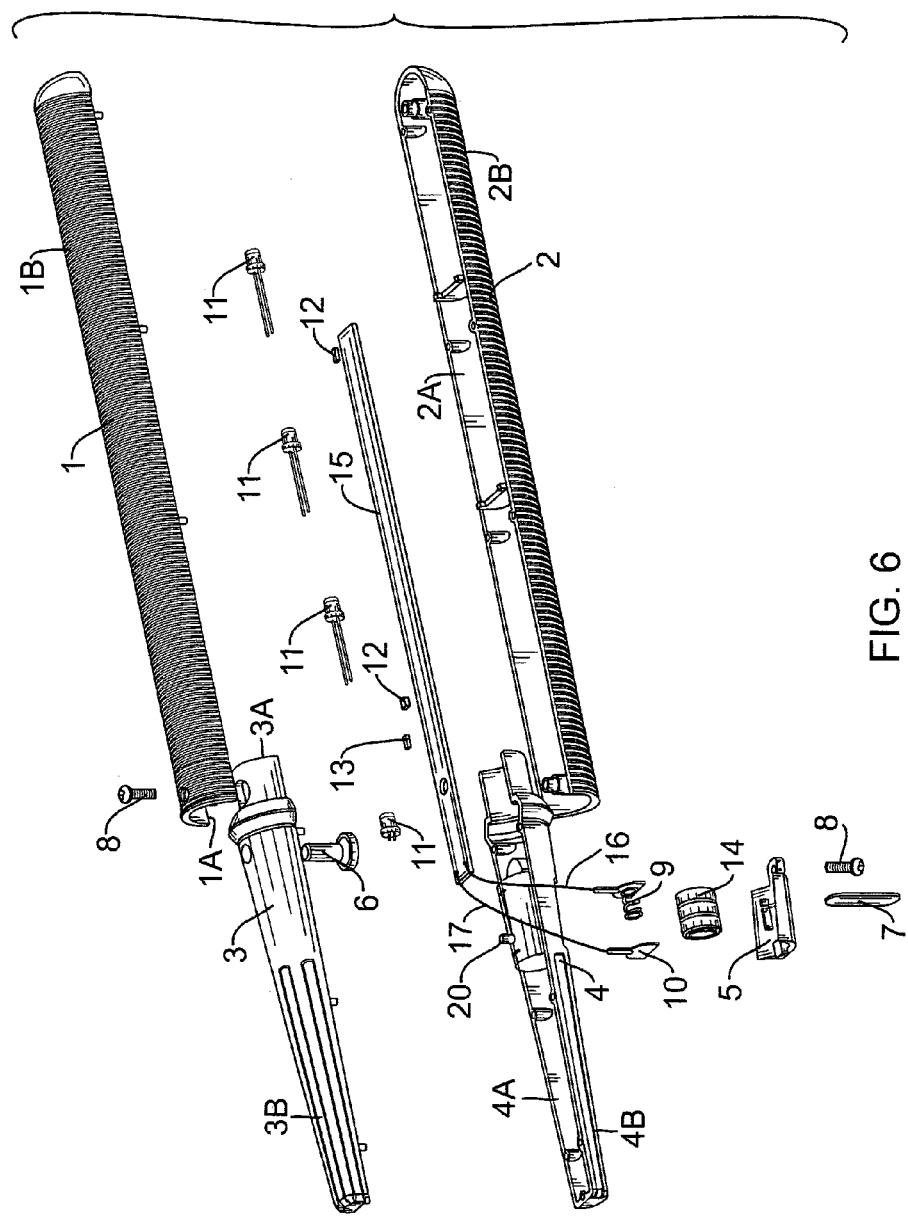
FIG. 6 is an exploded view of the present invention handheld illuminated apparatus for retaining a food item in an edible condition with the food item removed from the apparatus.

Retained within the elongated interior chambers 1A and 2A is a circuit board 15 which retains at least one electric resistance 12 and as illustrated in the exploded view of FIG. 6, two resistances 12. The circuit board 15 also retains an integrated circuit 13. A key feature of the present invention is that the circuit board 15 is also connected to a multiplicity of light emitting diodes (LEDS) 11 which are positioned so that illumination created by the LEDs 11 will shine directly through the upper cover 1 and bottom cover 2. A first power cable 16 connects the anode battery slice 9 to the circuit board 15 and a second power cable 17 connects the cathode battery slice 10 to the circuit board 15. The upper cover 1 and the bottom cover 2 are connected together and also respectively connected to the hand handle upper cover 3 and hand handle bottom cover 4 by connecting means such as screw 8. An activation switch 20 serves to cause electric current to flow from the battery 14 to the circuit board 15 and to cause the LEDs 11 to light up and generate illumination through upper cover 1 and lower cover 2. The integrated circuit 13 can be programmed to cause the LEDs to emit different lighting sequences and different color sequences. By way of example only, one LED 11 can be red, one LED 11 can be blue, one LED 11 can be green. It is within the spirit and scope of the present invention to have any number of LEDs housed on the circuit board 15 and emit illumination through the upper cover 1 and bottom cover 2 in any desired combination of colors. In addition, the integrated circuit 13 can be programmed to emit different types of illumination sequences depending on how many times the activation means such as activation switch 20 is moved or depressed. By way of example, the lighting sequences of the LEDs can be fully on, fully off, flashing on and off in unison, flashing on and off sequentially from one end of the circuit board to the other end and back and forth, and flashing on and off sequentially or in unison with the same color or different colors.

Figure 7:
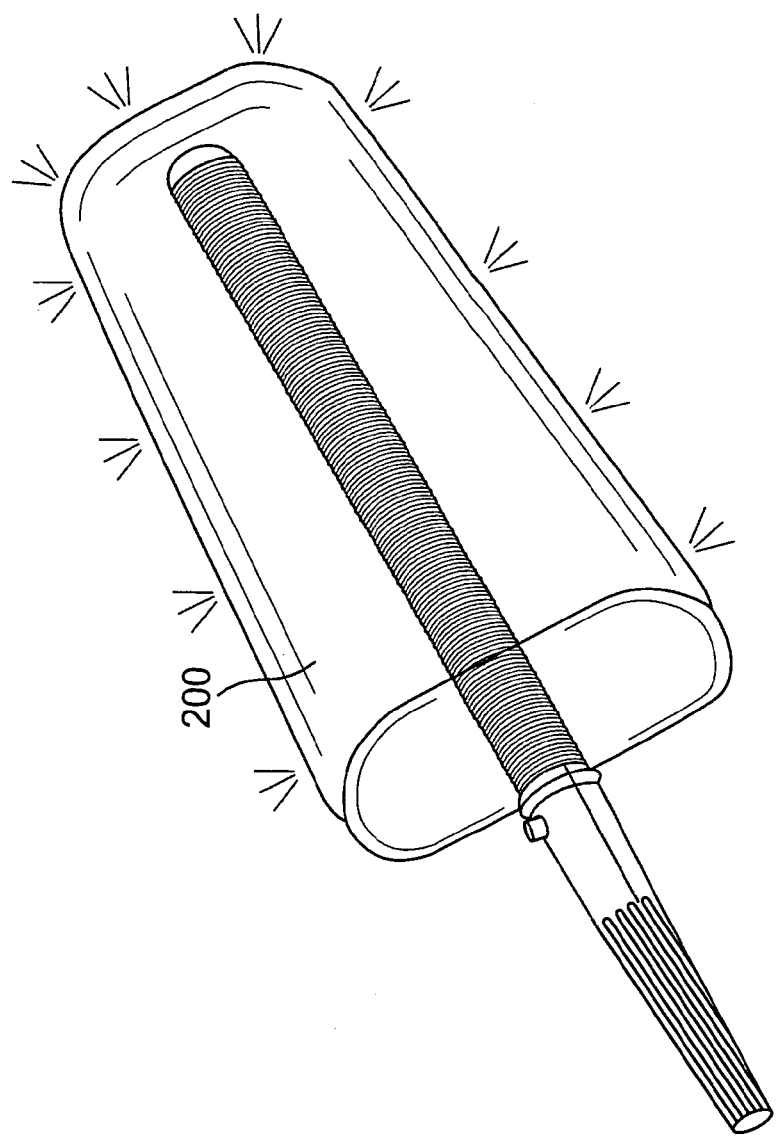
FIG. 7 is a perspective view of the present invention handheld illuminated apparatus for retaining a food item in an edible condition with one type of food item retained thereon and the illumination directly projecting through the food item.
Figure 8:
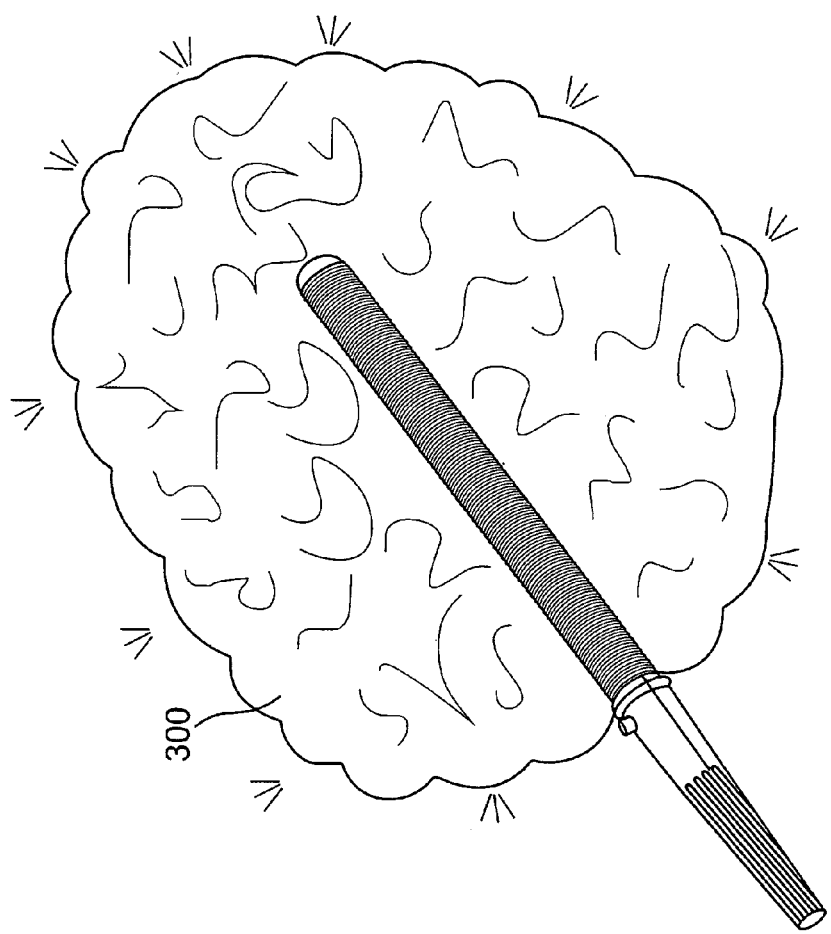
FIG. 8 is a perspective view of the present invention handheld illuminated apparatus for retaining a food item in an edible condition with a second type of food item retained thereon and the illumination directly projecting through the food item.

The key innovation of the present invention which distinguishes it over the prior art is that the illumination is directly projected through the edible food item. Referring to FIG. 7, an ice cream stick or fruit bar 200 is shown retained on the upper cover 1 and bottom cover 2 so that the illumination from the LEDs 11 is directly projected through the food item ice cream bar or fruit bar 200. Referring to FIG. 8, cotton candy 300 is shown retained on the upper cover 1 and bottom cover 2 so that the illumination from the LEDs 11 is directly projected through the cotton candy. The optional ribs 1B and 2B serve to more securely grasp and retain the food item such as the ice cream bar or fruit bar 200 or cotton candy 300 on the upper cover 1 and bottom cover 2. In this way, the user holds the apparatus 100 by the hand handle upper cover 3 and hand handle bottom cover 4 and can move or depress the activation switch 20 to cause the LEDs to emit any desired lighting sequence which because of the position of the LEDs within the interior chambers 1A and 2A, causes the illumination and lighting sequence to directly project through the edible food items 200 and 300 to thereby provide an enhanced visual effect which is both aesthetic and ornamental to provide enhanced enjoyment while the food item is consumed. The apparatus 100 can be washed an reused with new food items placed on and retained by the upper cover 1 and bottom cover 2.

Therefore, through use of the present invention, the apparatus 100 enables an edible food item to be retained by the apparatus 100 in a manner by which the edible food item can be consumed while being retained on the apparatus 100 and also facilitates providing a beautiful aesthetic visual effect which is projected directly through the food item as it is being consumed. While the food item has been depicted as an ice cram or fruit bar or cotton candy, it will be appreciated that it is within the spirit and scope of the present invention for any food item to be retained.

In the preferred embodiment, the housings 1 and 2 are made of plastic but any material which is transparent or translucent and enables light to shine through it can be used with the present invention.

Defined in detail, the present invention is an apparatus to retain an edible food item, comprising: (a) an upper illumination cover having an exterior surface with ribs thereon and an elongated interior chamber and a bottom illumination cover having an exterior surface with ribs thereon and an elongated interior chamber, the upper and lower illumination covers fitted together so that their respective interior chambers are aligned and their respective ribs are aligned; (b) a hand handle upper cover having an interior chamber and a hand handle bottom cover having an interior chamber, the upper and bottom handle covers fitted together so that their respective interior chambers are aligned, a battery retained within the aligned interior chambers and surrounded on opposite ends by an anode battery slice and a cathode battery slice and covered by a battery cover on one of the handle covers, the handle covers connected to the upper and lower illumination covers; (c) a circuit board retained within the interior chambers of the upper and lower illumination covers and electrically connected to the anode battery slice and cathode battery slice, resistance means and an integrated circuit also connected to the circuit board and a multiplicity of LEDs electrically connected to the circuit board; (d) activation means connected to the battery which when activated enables the LEDs to emit illumination through the upper illumination cover and bottom illumination cover; and (e) an edible food item retained on the upper and bottom illumination covers by their respective ribs so that the illumination from the LEDs directly projects through the upper and lower illumination covers and directly projects into and through the edible food item.

Defined broadly, the present invention is an apparatus to retain an edible food item, comprising: (a) an illumination cover having an interior chamber and connected to a handle member having an interior chamber; (b) a source of electrical power retained within the interior chamber of the handle member and an activation means connected to the source of power; (c) a circuit board retained within the interior chamber of the illumination cover and electrically connected to the source of power, an integrated circuit also connected to the circuit board and a multiplicity of LEDs electrically connected to the circuit board; (d) when activated by the activation means, the LEDs emit illumination through the illumination cover; and (e) an edible food item retained on the illumination cover so that the illumination from the LEDs directly projects through the illumination cover and directly projects into and through the edible food item.

Defined more broadly, the present invention is an apparatus to retain an edible food item, comprising: (a) an illumination cover having an interior chamber and connected to a handle member having an interior chamber; (b) a source of electrical power retained within the interior chamber of the handle member and an activation means connected to the source of power; (c) a circuit board retained within the interior chamber of the illumination cover and electrically connected to the source of power, an integrated circuit also connected to the circuit board and a source of illumination electrically connected to the circuit board; (d) when activated by the activation means, the source of illumination emits illumination through the illumination cover; and (e) an edible food item retained on the illumination cover so that the illumination from the source of illumination directly projects through the illumination cover and directly projects into and through the edible food item.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus to retain an edible food item, comprising:
   a. an upper illumination cover having an exterior surface with ribs thereon and an elongated interior chamber and a bottom illumination cover having an exterior surface with ribs thereon and an elongated interior chamber, the upper and lower illumination covers fitted together so that their respective interior chambers are aligned and their respective ribs are aligned;
   b. a hand handle upper cover having an interior chamber and a hand handle bottom cover having an interior chamber, the upper and bottom handle covers fitted together so that their respective interior chambers are aligned, a battery retained within the aligned interior chambers and surrounded on opposite ends by an anode battery slice and a cathode battery slice and covered by a battery cover on one of the handle covers, the handle covers connected to the upper and lower illumination covers;
   c. a circuit board retained within the interior chambers of the upper and lower illumination covers and electrically connected to the anode battery slice and cathode battery slice, resistance means and an integrated circuit also connected to the circuit board and a multiplicity of LEDs electrically connected to the circuit board;
   d. activation means connected to said battery which when activated enables the LEDs to emit illumination through the upper illumination cover and bottom illumination cover; and
   e. an edible food item retained on the upper and bottom illumination covers by their respective ribs so that the illumination from the LEDs directly projects through the upper and lower illumination covers and directly projects into and through the edible food item.

2. The apparatus in accordance with claim 1 wherein the upper illumination cover and bottom illumination cover are made from materials selected from the group consisting of transparent material and translucent material.

3. The apparatus in accordance with claim 1 further comprising an insulating slice to disconnect the battery.

4. The apparatus in accordance with claim 1 wherein the integrated circuit is programmed to enable the LEDs to emit different illumination sequences and different colors upon activation by the activation means.

5. An apparatus to retain an edible food item, comprising:
   a. an illumination cover having an interior chamber and connected to a handle member having an interior chamber;
   b. a source of electrical power retained within the interior chamber of the handle member and an activation means connected to the source of power;
   c. a circuit board retained within the interior chamber of the illumination cover and electrically connected to the source of power, an integrated circuit also connected to the circuit board and a multiplicity of LEDs electrically connected to the circuit board;
   d. when activated by the activation means, the LEDs emit illumination through the illumination cover; and e. an edible food item retained on the illumination cover so that the illumination from the LEDs directly projects through the illumination cover and directly projects into and through the edible food item.

6. The apparatus in accordance with claim 5 wherein the source of power is a battery.

7. The apparatus in accordance with claim 5 wherein the illumination cover has an exterior surface which comprises retaining ribs to facilitate retention of the edible food item on the illumination cover.

8. The apparatus in accordance with claim 5 wherein the handle has an exterior surface which comprises ribs to facilitate holding the handle.

9. The apparatus in accordance with claim 5 wherein the illumination cover is made from materials selected from the group consisting of transparent material and translucent material.

10. The apparatus in accordance with claim 5 further comprising means to disconnect the source of power.

11. The apparatus in accordance with claim 5 wherein the integrated circuit is programmed to enable the LEDs to emit different illumination sequences.

12. The apparatus in accordance with claim 5 wherein the LEDs illuminate different colors.

13. An apparatus to retain an edible food item, comprising:
   a. an illumination cover having an interior chamber and connected to a handle member having an interior chamber;
   b. a source of electrical power retained within the interior chamber of the handle member and an activation means connected to the source of power;
   c. a circuit board retained within the interior chamber of the illumination cover and electrically connected to the source of power, an integrated circuit also connected to the circuit board and a source of illumination electrically connected to the circuit board;
   d. when activated by the activation means, the source of illumination emits illumination through the illumination cover; and
   e. an edible food item retained on the illumination cover so that the illumination from the source of illumination directly projects through the illumination cover and directly projects into and through the edible food item.

14. The apparatus in accordance with claim 13 wherein the source of illumination is at least one LED.

15. The apparatus in accordance with claim 13 wherein the source of power is a battery.

16. The apparatus in accordance with claim 13 wherein the illumination cover has an exterior surface which comprises retaining ribs to facilitate retention of the edible food item on the illumination cover.

17. The apparatus in accordance with claim 13 wherein the handle has an exterior surface which comprises ribs to facilitate holding the handle.

18. The apparatus in accordance with claim 13 wherein the illumination cover is made from materials selected from the group consisting of transparent material and translucent material.

19. The apparatus in accordance with claim 13 wherein the integrated circuit is programmed to enable the source of illumination to emit different illumination sequences.

20. The apparatus in accordance with claim 13 wherein the source of illumination emits different colors.

\* \* \* \* \*